United States Patent [19]

Shiew

[11] Patent Number: 5,328,193
[45] Date of Patent: Jul. 12, 1994

[54] SCOOTING AND COASTING GOLF CART TRICYCLE

[76] Inventor: James A. Shiew, P.O. Box 3134, Buena Vista, Colo. 81211

[21] Appl. No.: 990,898
[22] Filed: Dec. 16, 1992
[51] Int. Cl.$^5$ .............. B62D 3/02; B62D 3/12
[52] U.S. Cl. ............... 280/87.041; 280/651; 280/62; 280/DIG. 6
[58] Field of Search .......... 280/87.01, 87.021, 87.041, 280/87.05, 287, 282, 62, 278, 651, 646, 655, 35, 639, 47.34, DIG. 6

[56] References Cited

U.S. PATENT DOCUMENTS

| | | | |
|---|---|---|---|
| 1,570,787 | 1/1926 | Schroeder | 280/87.041 X |
| 1,664,858 | 4/1928 | Headley | 280/87.05 X |
| 1,674,272 | 6/1928 | Zander | 280/87.041 |
| 2,872,205 | 2/1959 | Waddell | 280/87.01 |
| 2,926,927 | 3/1960 | Enright | 280/87.02 R |
| 3,489,426 | 1/1970 | Bond | 280/DIG. 6 X |
| 4,289,324 | 9/1981 | Nemeth | 280/38 |
| 4,431,205 | 2/1984 | Speicher et al. | 280/282 |
| 4,526,390 | 7/1985 | Skolnik | 280/87.041 |
| 4,538,695 | 9/1985 | Bradt | 180/19.2 |
| 4,540,192 | 9/1985 | Shelton | 280/87.041 X |
| 5,039,121 | 8/1991 | Holter | 280/87.041 X |

FOREIGN PATENT DOCUMENTS

| | | | |
|---|---|---|---|
| 2607089 | 5/1988 | France | 280/87.041 |
| 126364 | 10/1949 | Sweden | 280/87.041 |

*Primary Examiner*—Margaret A. Focarino
*Assistant Examiner*—Michael Mar
*Attorney, Agent, or Firm*—John R. Flanagan

[57] ABSTRACT

A scooting and coasting golf cart tricycle includes a frame having a main portion and a front portion rotatably mounted to the main portion, a center front wheel rotatably mounted to the front frame portion and a pair of right and left back wheels mounted to opposite rear sides of the main frame portion for rotation about a horizontal axis, a pair of right and left handlebars are connected to the front frame portion for steering the front wheel, and a platform supported by the main frame portion spaced below the horizontal rotational axis of the back wheels. The main frame portion includes a pair of right and left inverted U-shaped back forks rotatably mounting the right and left back wheels and a pair of spaced horizontal right and left support members. The platform is supported upon and between the spaced right and left support members.

16 Claims, 2 Drawing Sheets

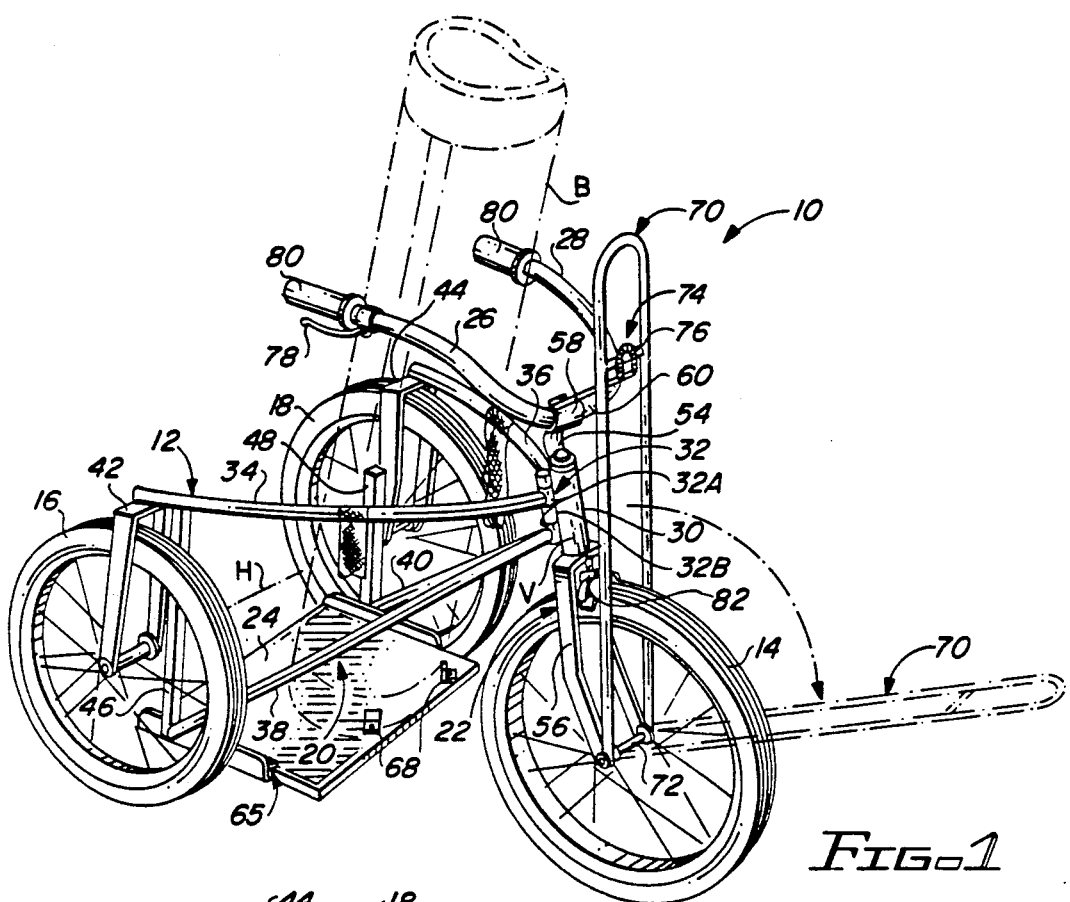
FIG-1
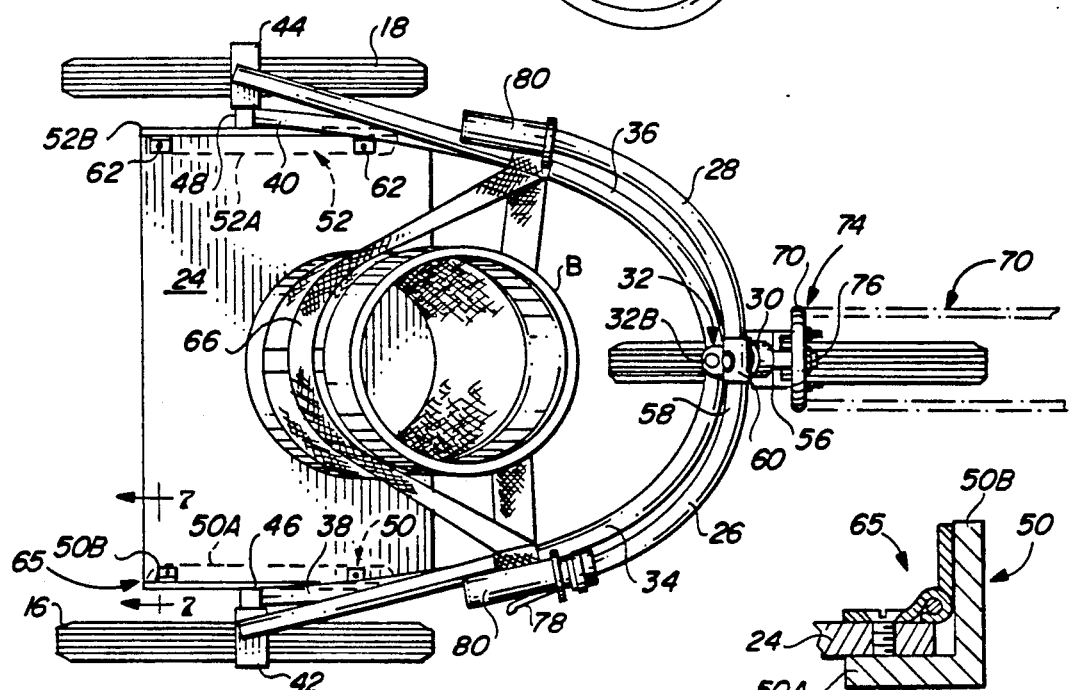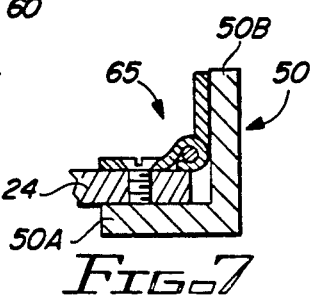
FIG-2  FIG-7

SCOOTING AND COASTING GOLF CART TRICYCLE

BACKGROUND OF THE INVENTION

1. Field of the Invention

The present invention generally relates to a golf cart and, more particularly, is concerned with a scooting and coasting golf cart tricycle.

2. Description of the Prior Art

Golf is a very popular sport participated in by millions of people, young and old alike. It is one of a very limited number of sports that can be played with success by the elderly and which offers them some useful exercise. Some golfers walk and manually pull golf carts to transport their golf bags filled with clubs. Other golfers ride and transport their golf bags on motorized riding carts.

Many golfers who use manually pulled golf carts get too much exercise and thus experience a deterioration in their playing skills during play on the later holes of a round. On the other hand, golfers who use motorized riding carts may get too little exercise and thus miss out on some important benefits of the sport. A golf cart would be desirable which allows each golfer to decide when to walk and when to ride so as to select the desired amount of exercise.

An alternative type of golf cart has been proposed in U.S. Pat. No. 4,538,695 to Bradt to provide golfers with the option of walking part of the time and riding the rest of the time. The cited patent discloses a self-propelled golf cart having a frame supported by a pair of rear drive wheels and a single front steerable wheel and, in turn, supporting a riding platform. An upright section which projects upwardly from the middle of the platform has a cross bar at its upper end with hand holds for persons to grip standing on the platform between the rear wheels. A steering wheel is provided on the frame forwardly of the upright section for steering the front wheel. The golf cart is self-propelled by a pair of electric motors drivingly connected by drive chains to the rear wheels and a pair of batteries mounted on the platform for supplying power to the motors. A foot-actuated control level extends upwardly through the platform for actuating forward drive motion. A hitch pole is pivotally mounted to the front of the frame for manually pulling the golf cart. The cart has to be towed behind the golfer's vehicle.

While the self-propelled golf cart of the cited patent is a step in the right direction, it does not appear to be a practical solution. The self-propelled golf cart by having a pair of electric motors and a pair of batteries is too heavy to pull over the golf course. The construction of the golf cart does not lend itself to being folded for storage and transport in the trunk of a vehicle. Instead, the golf cart has to be towed behind the vehicle. The upright section on the golf cart which golfers grip while riding the golf cart in standing position appears to partially block access to the steering wheel for steering the front wheel. In summary, the golf cart of the cited patent is too clumsy, heavy and expensive to constitute a satisfactory solution.

Thus, a need still exists for a combined walking and riding golf cart which will overcome the drawbacks of the golf cart of the cited patent.

SUMMARY OF THE INVENTION

The present invention provides a scooting and coasting golf cart tricycle designed to satisfy the aforementioned need. The golf cart tricycle of the present invention comprises: (a) a frame having a main portion and a front portion rotatably mounted to the main portion; (b) a center front wheel mounted to the front portion of the frame; (c) means connected to the front portion for steering the front wheel; (d) a pair of right and left back wheels mounted to opposite sides of the main portion of the frame for rotation about a generally horizontal rotational axis; and (e) a platform supported by the main portion of the frame spaced below the horizontal rotational axis of the back wheels.

More particularly, the main portion of the frame includes upper and lower pairs of right and left arms arranged in generally V-shaped configurations. The main frame portion also includes means for defining a front hinge having a first fixed part and a second part pivotally connected and rotatable relative to the first part. The upper and lower right and left arms at their front ends are connected respectively to the first and second parts of the hinge and extend rearwardly in a generally horizontal plane.

Also, the main frame portion includes a pair of right and left inverted U-shaped back forks rotatably mounting the right and left back wheels, a pair of elongated right and left vertical braces rigidly attached to rear ends of the upper pair of right and left arms and rigidly attached to interior sides of the right and left back forks, and a pair of generally horizontal spaced right and left support members being rigidly attached to lower ends of the right and left vertical braces and lower ends of the lower pair of right and left lower arms. The platform is supported upon and between the pair of spaced right and left support members.

The front frame portion includes an elongated shaft rotatably mounted through a front end of the main portion of the frame, and a front fork rigidly attached to and depending from a lower end of the elongated shaft and rotatably mounting the front wheel. The steering means includes a pair of right and left handlebars, a cross bar extending between and rigidly interconnecting the handlebars, and means for attaching the cross bar to an upper end of the elongated shaft. The right and left handlebars extend rearwardly and in spaced relation above the upper right and left arms. The tricycle also includes means attached to the main portion of the frame for securing a golf bag on the platform and between the right and left handlebars with standing room for a golfer remaining on the platform rearwardly of the golf bag.

Further, the golf cart tricycle includes an elongated towing handle pivotally mounted to the front frame portion and a latching mechanism mounted to the front frame portion. The latching mechanism is operable for releasably retaining the towing handle in a stored vertical position when not in use and permitting pulling of the towing handle to a forwardly extending towing position.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a front perspective view of a scooting and coasting golf cart tricycle of the present invention in an erected operative position.

FIG. 2 is a top plan view of the golf cart tricycle.

FIG. 7 is an enlarged fragmentary sectional view of a hinged connection between a portion of the platform and support frame taken along line 7—7 of FIG. 2.

DETAILED DESCRIPTION OF THE INVENTION

Figure 3:
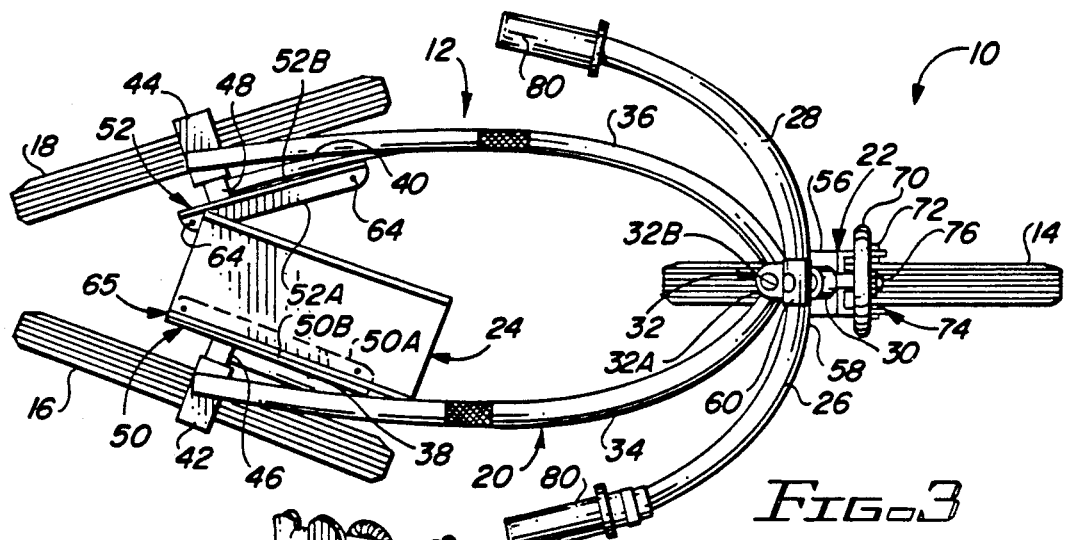
FIG. 3 is a top plan view of the golf cart tricycle in a collapsed or folded stored position.

Referring to the drawings, and particularly to FIGS. 1 and 2, there is illustrated a scooting and coasting golf cart tricycle, generally designated 10, constructed in accordance with the principles of the present invention. The golf cart tricycle 10 basically includes a frame 12 and three wheels, one center front wheel 14 and two right and left back wheels 16, 18. The frame 12 has a main portion 20 and a front portion 22 rotatably mounted to the main portion 20 about a generally vertical axis V. The golf cart tricycle 10 also includes a platform 24 supported on the main frame portion 20 below a generally horizontal rotational axis H of the right and left back wheels 16, 18, and a pair of right and left handlebars 26, 28 mounted to the front portion 22 of the frame 12. The center front wheel 14 and right and left back wheels 16, 18 are provided in a triangular arrangement, with the front wheel 14 mounted to the rotatable front portion 22 of the frame 12 for steering by turning the right and left handlebars 26, 28 in either clockwise or counterclockwise directions about the vertical axis V.

Referring to FIGS. 1 to 4, the main frame portion 20 of the frame 12 includes a journal tube 30 and a hinge 32. The hinge 32 has a first part 32A rigidly connected to the journal tube 30 and a second part 32B pivotally connected and rotatable relative to the first part 32A. Also, the main frame portion 20 includes upper and lower pairs of right and left arms 34, 36 and 38, 40 arranged in respective V-shaped configurations and rigidly connected at their front ends respectively to the first and second parts 32A, 32B of the hinge 32. The upper right and left arms 34, 36 extend rearwardly from the hinge 32 in a generally horizontal plane, whereas the lower right and left arms 38, 40 extend in declining fashion rearwardly and downwardly from the hinge 32.

The main frame portion 20 further includes a pair of right and left inverted U-shaped back wheel mounting forks 42, 44 rigidly attached to the rear ends of the upper pair of right and left arms 34, 36, and a pair of elongated right and left vertical braces 46, 48 rigidly attached to the interior sides of the right and left back forks 42, 44. The main frame portion 20 also includes a pair of generally horizontal right and left support members 50, 52 of angle cross-sectional shape being rigidly attached to the lower ends of the right and left vertical brace rods 46, 48 and of the lower pair of declining right and left lower arms 38, 40.

The rotatable front portion 22 of the frame 12 includes an elongated shaft 54 rotatably mounted through the journal tube 30 for rotation about the vertical axis V and a front fork 56 rigidly attached to and depending from the lower end of the shaft 54. The front wheel 14 is rotatably mounted between the lower ends of the front fork 56. The right and left handlebars 26, 28 are rigidly connected together by a cross bar 58 which, in turn, to attached to the upper end of the shaft 54 by a clamp 60. The right and left handlebars 26, 28 extend rearwardly and are spaced above the upper right and left arms 34, 36.

Referring to FIGS. 1 and 2, the platform 24 is supported upon and between the horizontal and vertical portions 50A,50B and 52A, 52B of the spaced pair of right and left support members 50, 52, spaced below the horizontal rotational axis of the back wheels 16, 18 and at a short distance above the ground. Such location of the platform 24 provides a low center of gravity for improved stability and makes it comfortable for the golfer to step up and ride with one foot on the platform 24 and kick the golf cart tricycle 10 in a forward direction with the other foot. When coasting, the golfer stands with both feet on a rear portion of the platform 24 behind a golf bag B placed on a front portion thereof.

Figure 5:
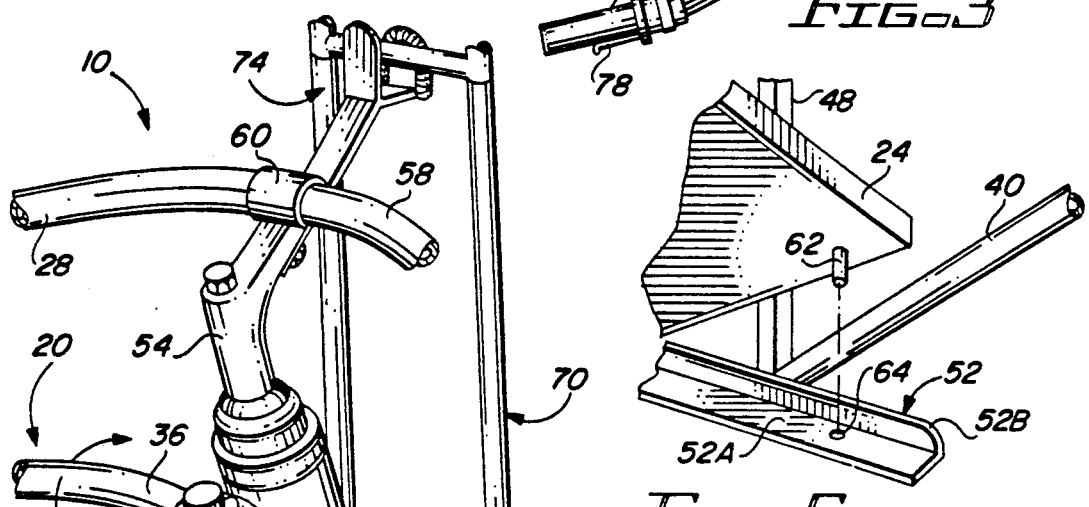
FIG. 5 is an enlarged fragmentary exploded view of a portion of the platform and support frame of the chassis of the golf cart tricycle.
Figure 4:
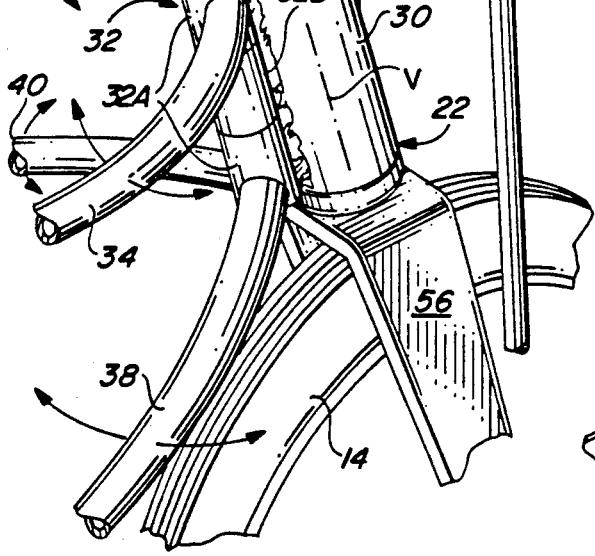
FIG. 4 is an enlarged fragmentary perspective view of a portion of the chassis of the golf cart tricycle.
Figure 6:
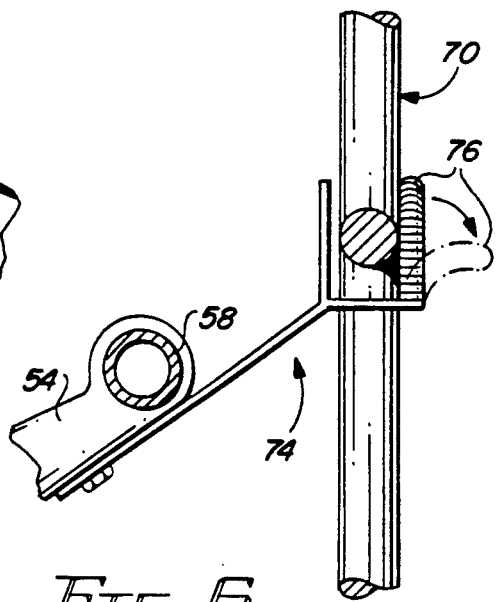
FIG. 6 is an enlarged side elevational view of a hitch assembly of the golf cart tricycle.

Referring to FIGS. 3 and 5, the platform 24 has a pair of spaced pins 62 affixed to and protruding downwardly from the underside of the platform 24 along the left one 24A of the opposite side edge portions of the platform 24. The corresponding left support member 52 has a pair of spaced apertures 64 for removably receiving the spaced pins 62. The right one 24B of the opposite side edge portions of the platform 24 is pivotally attached by hinged connection 65 to the corresponding right support members 50. The platform 24 is thus pivotally movable about the hinged connection 65 between the lower operative position of FIGS. 1 and 2 and the upper stored position of FIG. 3.

As seen in FIGS. 1 and 2, the golf bag B is placed on the front portion of the platform 24 and rests between the right and left handlebars 26, 28 where it is retained by a strap 66 encircling the upper portion of the bag B and attached to the main frame portion 20. Also, another strap (not shown) is preferably attached to a pair of brackets 68 mounted along the front portion of the platform 24 for encircling the lower portion of the bag B.

Referring to FIGS. 1 to 3, 4 and 6, the golf cart tricycle 10 also includes an elongated U-shaped towing handle 70 pivotally mounted to the opposite ends of a front spindle 72 of the center front wheel 14. A latching mechanism 74 is mounted to the clamp 60 on the upper end of the shaft 54 and has a spring-loaded pivotal finger 76 for releasably retaining the towing handle 70 in the stored vertical position when not in use. By merely pulling forward on the towing handle 70, the finger 76 will pivot forwardly to unblock the pivotal path of the handle 70 from the stored vertical position, as seen in solid line form in FIGS. 1 and 2, to a forwardly extending towing position, as seen in dashed line form in FIGS. 1 and 2.

The tricycle 10 also preferably includes a braking system which can be conventional per se. The braking system includes a brake actuating handle 78 mounted on one of the right and left handlebars 26, 28 near the handgrips 80 on the rear ends thereof, a sissor-type braking shoe mechanism 82 mounted to the front fork 56, and a motion-transmitting cable (not shown) extending between and interconnecting the handle 78 and braking shoe mechanism 82. Alternatively, a pair of such braking systems can be mounted to each of the right and left handlebars 26, 28 and to the right and left back forks 42, 44 such that the braking force is applied at the back wheels instead of the front wheel.

From the above description, one can understand that the golf cart tricycle 10 of the present invention is to be used as a three-wheeled scooter. The golf bag B is placed on the platform 24 between the two rear wheels 16, 18 and upright between the handlebars 26, 28. The golfer rests one foot on the platform 24 and pushes off with the other foot behind the platform. The golf cart tricycle 10 will replace the conventional two-wheeled pull-type golf cart. For transport to and from the golf course, the tricycle 10 can be converted from the erected position shown in FIGS. 1 and 2 to a collapsed stored position shown in FIG. 3 by pivotally lifting the platform 24 upwardly and moving the right and left handlebars 26, 28 relative and toward one another which reduces the space occupied by the tricycle 10 so that it can be placed in the trunk of most automobiles.

The golf cart tricycle 10 embodies many advantages. First, the tricycle 10 is much faster than the prior art two-wheeled pull-type golf cart or a golfer carrying a golf bag. Further, it can easily stay up with motorized carts.

Second, the golf cart tricycle 10 is enjoyable and easy to use. The golfer is coasting or riding most of the time. One push or kick moves the tricycle 20 to 30 yards on level ground. Also, while the golfer has to kick off to go uphill, on most golf courses the golfer will then be able to coast an equal distance downhill.

Third, if the hill is too steep to push or kick up, the front handle can then be used to pull the relatively lightweight tricycle up the hill from the front. It pulls easier than the two-wheeled pull-type cart because the tricycle employs large bicycle-size wheels.

Fourth, the golf cart tricycle 10 will provides the amount of exercise desired by the golfer. If one leg of the golfer tires of kicking, the other can be used. Or the golfer can pull the tricycle 10 with a quick release of the front handle.

Fifth, the golfer using the tricycle 10 can be go directly to the location of his or her ball. The tricycle 10 does not have to stay on the cart paths as with motorized carts. Sixth, club access is easy, as the golf bag is carried by and attached to the tricycle at a convenient angle.

Seventh, widespread use of the tricycle 10 should reduce congestion on golf courses because of its speed of movement about the course and the freedom it give to users to go directly to their balls. Eighth, the tricycle 10 folds for easy storage and hauling in the trunk and is light enough, approximately 36 pounds, to lift.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A scooting and coasting golf cart tricycle, comprising:

(a) a frame having a main portion and a front portion rotatably mounted to said main portion;
   (b) a center front wheel mounted to said front portion of said frame by means of a front spindle;
   (c) means connected to said front portion for steering said front wheel, said steering means including a pair of right and left handlebars mounted to said front portion of said frame;
   (d) an elongated towing handle pivotally mounted to opposite ends of said front spindle;
   (e) a pair of right and left back wheels mounted at opposite sides of said main portion of said frame for rotation about a generally horizontally rotational axis; and
   (f) a platform supported between said back wheels and spaced below said horizontal rotational axis of said back wheels;
   (g) said main portion of said frame including upper and lower rear structures located at said opposite sides thereof, said upper rear structures of said main portion of said frame having upper ends extending above said right and left back wheels and lower ends defining said horizontal axis and mounting said right and left back wheels at said opposite sides of said main portion of said frame to undergo rotation about said horizontal rotational axis, said lower rear structures of said main portion of said frame being located between said back wheels and supporting said platform between said back wheels and spaced below said horizontal rotational axis of said back wheels so as to provide a center of gravity of said platform below said horizontal rotational axis.

2. The golf cart tricycle of claim 1 wherein said main portion of said frame includes an upper pair of right and left arms arranged in a generally V-shaped configuration.

3. The golf cart tricycle of claim 2 wherein said main portion of said frame also includes:
   means for defining a front hinge having a first fixed part and a second part pivotally connected and rotatable relative to said first part; and
   said upper right and left arms being connected at front ends respectively to said first and second parts of said hinge and extending rearwardly therefrom in a generally horizontal plane.

4. The golf cart tricycle of claim 3 wherein said pair of right and left handlebars extends rearwardly and are spaced above said upper right and left arms.

5. The golf cart tricycle of claim 4 further comprising:
   means attached to said main portion of said frame for securing a golf bag on said platform and between said right and left handlebars with standing room for a golfer on said platform rearwardly of the golf bag.

6. The golf cart tricycle of claim 1 wherein said main portion of said frame includes a lower pair of right and left arms arranged in a generally V-shaped configuration.

7. The golf cart tricycle of claim 6 wherein said main portion of said frame also includes:
   means for defining a front hinge having a first fixed part and a second part pivotally connected and rotatable relative to said first part; and
   said lower right and left arms being connected at front ends respectively to said first and second parts of said hinge and extending rearwardly and downwardly therefrom.

8. The golf cart tricycle of claim 1 wherein said upper rear structures of said main portion of said frame include right and left inverted U-shaped back forks defining said horizontal rotational axis and rotatably mounting said right and left back wheels to undergo rotation about said horizontal rotational axis.

9. The golf cart tricycle of claim 8 wherein said lower rear structures of said main portion of said frame include elongated right and left vertical braces rigidly attached to interior sides of said right and left back forks.

10. The golf cart tricycle of claim 9 wherein said lower rear structures of said main portion of said frame also include generally horizontal spaced right and left support members being rigidly attached to lower ends of said right and left vertical braces.

11. The golf cart tricycle of claim 10 wherein said platform is supported upon and between said pair of spaced right and left support members.

12. The golf cart tricycle of claim 11 wherein:
said platform has a pair of spaced pins affixed to and protruding downwardly from an underside of said platform along one opposite side edge portion thereof; and
one of said right and left support members has a pair of spaced apertures for removably receiving said spaced pins.

13. The golf cart tricycle of claim 1 wherein said front portion of said frame includes:
an elongated shaft rotatably mounted through a front end of said main portion of said frame; and
a front fork rigidly attached to and depending from a lower end of said shaft and rotatably mounting said front wheel.

14. The golf cart tricycle of claim 13 wherein said steering means includes:
a cross bar extending between and rigidly interconnecting said pair of handlebars; and
means for attaching said cross bar to an upper end of said elongated shaft.

15. The golf cart tricycle of claim 1 further comprising:
a latching mechanism mounted to said front portion of said frame and being operable for releasably retaining said towing handle in a stored vertical position when not in use and permitting pulling of said towing handle to a forwardly extending towing position.

16. A scooting and coasting golf cart tricycle, comprising:
(a) a frame having a main portion and a front portion rotatably mounted to said main portion, said main portion of said frame including upper and lower pairs of right and left arms arranged in generally V-shaped configurations and means for defining a front hinge having a first fixed part and a second part pivotally connected and rotatable relative to said first part, said upper and lower right and left arms at front ends being connected respectively to said first and second parts of said hinge defining means and extending rearwardly to rear ends such that said upper and lower right arms can be moved toward and away from said upper and lower left arms to convert said tricycle between a collapsed storage position and an erected operative position;
(b) a center front wheel mounted to said front portion of said frame by means of a front spindle;
(c) means connected to said front portion of said frame for steering said front wheel, said steering means including a pair of right and left handlebars mounted to said front portion of said frame;
(d) an elongated towing handle pivotally mounted to opposite ends of said front spindle;
(e) a pair of right and left back wheels being mounted at opposite sides of said main portion of said frame for rotation about a generally horizontal rotational axis; and
(f) a platform supported between said back wheels and spaced below said horizontal rotational axis of said back wheels;
(g) said main portion of said frame including upper and lower rear structures located at said opposite sides thereof, said upper rear structures of said main portion of said frame having upper ends extending above said right and left back wheels and being connected to said rear ends of said upper right and left arms and having lower ends defining said horizontal axis and mounting said right and left back wheels at said opposite sides of said main portion of said frame to undergo rotation about said horizontal rotational axis, said lower rear structures of said main portion of said frame being connected to said rear ends of said lower right and left arms and located between said back wheels and supporting said platform between said back wheels and spaced below said horizontal rotational axis of said back wheels so as to provide a center of gravity of said platform below said horizontal rotational axis.

* * * * *